(12) United States Patent
Ebersberger

(10) Patent No.: US 7,174,267 B2
(45) Date of Patent: Feb. 6, 2007

(54) COMPUTER-ASSISTED METHOD FOR CALCULATING THE TEMPERATURE OF A SOLID BODY

(75) Inventor: Johannes Ebersberger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 11/051,355

(22) Filed: Feb. 4, 2005

(65) Prior Publication Data

US 2006/0095215 A1  May 4, 2006

(30) Foreign Application Priority Data

Feb. 6, 2004  (DE) .................... 10 2004 005 918

(51) Int. Cl.
*H05G 1/36* (2006.01)
*G06F 19/00* (2006.01)

(52) U.S. Cl. ...................... 702/130; 378/118

(58) Field of Classification Search .......... 702/35, 702/130, 155; 378/124, 117, 132; 700/117
See application file for complete search history.

(56) References Cited

U.S. PATENT DOCUMENTS

| 5,583,780 | A | * | 12/1996 | Kee et al. ............... 700/117 |
| 5,838,763 | A | * | 11/1998 | Hiller et al. ............. 378/133 |
| 5,883,936 | A | | 3/1999 | Hell et al. |
| 6,084,942 | A | | 7/2000 | Hell et al. |
| 6,339,635 | B1 | | 1/2002 | Schardt et al. |
| 6,377,657 | B1 | | 4/2002 | Scholz |
| 2004/0213379 | A1 | * | 10/2004 | Bittl .................... 378/132 |

* cited by examiner

*Primary Examiner*—John Barlow
*Assistant Examiner*—Victor J. Taylor
(74) *Attorney, Agent, or Firm*—Schiff Hardin LLP

(57) ABSTRACT

In a method for the calculation of a temperature T of a solid body of a liquid cooling medium, or the time t needed for a temperature change of the solid body or the liquid cooling medium, the differential equation $dT/dt=b-cT$ is converted into a dimensionless differential equation. The function that solves the dimensionless differential equation is used to compile a matrix $\underline{A}(=a_{ij})$, with which T and/or t can be easily calculated.

14 Claims, 1 Drawing Sheet

COMPUTER-ASSISTED METHOD FOR CALCULATING THE TEMPERATURE OF A SOLID BODY

BACKGROUND OF THE INVENTION

1. Field of the Invention

The present invention concerns a computer-assisted method for calculation of temperature of a solid body, or the time needed to change the temperature of a solid body. In particular, the invention concerns a computer-assisted method, for making such a calculation for an anode of an x-ray tube.

2. Description of the Prior Art

For controlling the operating parameters of rotary piston x-ray tubes as described for example in German OS 196 31 899, German PS 198 10 346, and German PS 197 41 750 there is a need to determine the temperature of the anode.

A method and load calculator for the calculation of the spatiotemporal temperature distribution of an anode of an x-ray tube is known from German OS 198 11 041. With this known method it is possible to protect an x-ray device from overload conditions and simultaneously to operate it at optimally fully loaded conditions. A disadvantage of this method is that the calculation of the spatiotemporal temperature distribution, due to the high calculation effort, is time consuming. The method is not universally applicable. It must be adapted to the conditions of the x-ray tube in question and the physical state of the anode. That is expensive in time and cost.

SUMMARY OF THE INVENTION

An object of the present invention is to eliminate the aforementioned disadvantages in a method for making a calculation of this type. The method should in particular be a fast, simple, and as much as possible, accurate method, which allows a calculation of the temperature of an anode of an x-ray tube. Furthermore this method should allow a fast, simple, and as much as possible, accurate calculation of the time needed for a change of the temperature. A further object of the invention is to provide such a method that can be adapted to different physical characteristic of the anode, different x-ray tube geometries, different design types of x-ray tubes, as well as different load conditions in a simple way.

This object is achieved in accordance with the invention by a method for the calculation of the temperature T of a solid body or the time $\tau$ needed for a change of the temperature of a solid body, including the steps of:

i) defining a differential equation $$dT/dt = b - cT$$

wherein
T is the temperature of a solid body
t is time
b is per unit time temperature change caused by energy absorption $\Delta T_{EA}$,
cT is the per unit time temperature change caused by conductance of heat $\Delta T_{WA}$, ii) converting the differential equation into the following dimension-free (dimensionless) differential equation:

$$d\theta/d\tau = 1 - \theta,$$

wherein
$\theta$ is dimensionless temperature
$\tau$ is dimensionless time, iii) determining, and programming a computer with a function $\theta(\tau)$ or its inverse function $\tau(\theta)$ that is a solution to the dimensionless differential equation, and compiling a matrix $\underline{A}=(a_{ij})$, with i=1, 2; j $\in$ N; $a_{1j}=\tau_j$ and $a_{2j}=\theta_j$, for which $\theta(\tau)$ at the values $\tau_j$ makes: $\theta_j=\theta(\tau_j)$ and $\tau(\theta)$ at the values $\theta_j$ makes $\tau_j=\tau(\theta_j)$; and iv) in the computer, electronically determining the temperature T at time t, or the time t at temperature T,
 a) calculating $\tau$ or $\theta$ for t or T,
 b) calculating $\theta$ or $\tau$ using the values contained in $\underline{A}$, and
 c) calculating $\theta$ or $\tau$ respectively for the values calculated in b) for $\theta$ or $\tau$ In accordance with the inventive method the temperature change of the solid body with respect to time is given by the temperature change per unit time caused by energy absorption and the temperature change per unit time caused by loss of heat. The temperature change with respect to time can be specified by a differential equation. The conversion of the differential equation leads to a dimensionless differential equation with the dimensionless temperature $\theta$ and the dimensionless time $\tau$. The dimensionless differential equation and its function solution are independent of the physical characteristics, the geometry, the energy absorption, and the conductance of the solid body. The same is true for the entries $a_{ij}$ of the matrix $\underline{A}$. The ascertainment of T or t in steps iv) are based on the known values $a_{ij}$ of the matrix $\underline{A}$. The steps iv) a) through c) thus are not calculation-intensive and can be executed quickly. In particular the calculations in iv) a), and c) and b) can be executed by multiplication with simple scaling factors and contained in the execution of an approximation method. The approximation method can be a linear interpolation between values in $\underline{A}$. In particular the calculation outlay and calculation time decrease with repeated calculations of T or t.

The calculation of the dimensionless values from the temperature and the time, or the temperature and the time from the dimensionless values can be independent of the physical characteristics, the geometry, the energy absorption, and the heat conductance of the solid body. An adaptation of the method to differing physical characteristics of the solid body, differences in the energy absorption, heat radiation and heat conductance can be achieved in a simple way by an exchange of the matrix $\underline{A}$ or the scaling factor. A change of the calculation method in step iv) is not necessary. Furthermore the value of either $\theta(\tau)$ or $\tau(\theta)$ suffices for the calculation of the values $a_{ij}$ of the matrix $\underline{A}$. The method is even then executable, if the reverse function $\theta(\tau)$ of $\tau(\theta)$ or $\tau(\theta)$ of $\theta(\tau)$ is unknown, not existent or time consuming to calculate. The size of $\underline{A}$, given via j $\in$ N, is freely chosen. Consequently T or t can be calculated as accurately as desired.

In an embodiment of the method the solid body can be the anode of an x-ray tube. $\Delta T_{EA}$ can be caused by absorption of electrons. For consideration of the differing load cases, different physical characteristics of the anode as well as differences in the energy absorption and conductance of heat a change of scaling factors suffices. The matrix $\underline{A}$ need not be replaced.

The x-ray tube it can be a rotary piston x-ray tube. For this type of x-ray tube the temperature change $\Delta T_{WA}$ due to heat conductance can be caused by a cooling medium.

In a further embodiment of the method the coupling of the solid body to the cooling medium is considered to be ideal. The temperature of the cooling medium can be changeable and the temperature of the solid body and the cooling medium can equillibrilate. The time temperature change of the solid body can in an ideal coupling with the time temperature change of the cooling medium equillibrilate. The temperature change $\Delta T_{EA}$ caused by energy absorption can contain terms that specify energy absorbed by the anode and heat caused by friction of the rotary piston x-ray tube in the cooling medium. This allows an accurate calculation from T or t. In particular the time temperature change of the cooling medium can be considered in lieu of that of the solid body.

In a further embodiment of the invention the energy absorption of the solid body can be controlled by comparison of the temperature T or the time t with, respectively, at least one given or calculated limit value for T or t. The limit values can be acquired from the respective operating parameters of the x-ray device. In this embodiment the increased performance of the anode or the freely specified performance of the cathode can be monitored and limited. The x-ray tube and the cooling system can be protected from overheating, failure and damage. The computer of an x-ray computed tomography apparatus in which the x-ray device is installed, that would be available anyway, can be used for execution of the method. The method according to the invention imposes no great calculation burden calculation on the computer.

DESCRIPTION OF THE PREFERRED EMBODIMENTS

Figure 1:
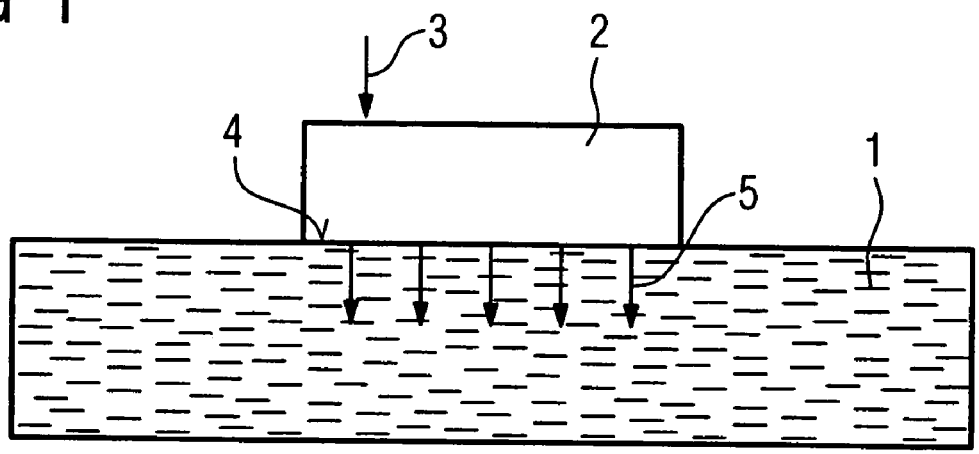
FIG. 1 schematically illustrates an anode plate of a rotary piston x-ray tube coupled to a cooling medium, with the cooling medium temperature being constant.

FIG. 1 schematically depicts an anode plate 2 coupled to a cooling medium 1, wherein the temperature $T_m$ of the cooling medium 1 is constant. An electron beam 3 produced by a cathode (not shown) strikes the anode plate 2. Heat conductance 5 follows at a first contact area 4 of the anode plate 2 with the cooling medium 1. The temperature change with respect to time $dT_a/dt$ is specified by the following differential equation:

$$dT_a/dt = P/C_P m - \lambda F/C_P m (T_a - T_M)$$

wherein
t denotes time
$T_a$ denotes temperature of the anode plate 2
$T_M$ denotes constant temperature of cooling medium 1
P denotes performance fed to the anode plate 2,
$\lambda$ denotes the heat conductance,
F denotes the first contact area 4
$C_p$ denotes the specific heat capacity of the material of the anode plate,
m denotes the mass of the anode plate 2.

In the differential equation the first term specifies temperature change with respect to time caused by the absorption of electrons of the beam of electrons on the right side. The second term specifies the temperature change with respect to time caused by the heat conductance 5 from the anode plate 2 to the cooling medium 1.

The dependency of the dimensionless temperature $\theta$ upon dimensionless time $\tau$ is given by the dimensionless free differential equation:

$$d\theta/d\tau = 1 - \theta.$$

wherein $\tau = t/t_K$, $\theta = T_A/T_K$, with $T_K = (P/\lambda F + T_M)$ $t_K = C_P m/\lambda F$ A general solution $\tau(\theta)$ is:

$$\tau = -\ln|1 - \theta| + C,$$

whereby C is the integration constant. For this purpose a starting temperature $\theta_0$: $\tau(\theta_0) = 0$ is valid.

Using the function $\tau(\theta)$ of the solution, the matrix $\underline{A} = (a_{ij})$ can be constructed with $I = 1,2$ and $j \in N$; in which defined values $a_{2j} = \theta_j$ are inserted into the function $\tau(\theta)$ and this is calculated. $a_{1j} = \tau(\theta_j)$ is valid for the values of the matrix to be calculated. By means of the matrix the temperature T at a point in time t can be calculated in a computer by:

a) calculation of $\tau$: $\tau = t/t_K$,
b) calculation of $\theta$:
   selection of values $a_{1j}$, $a_{1(j+1)}$ of the matrix $\underline{A}$ with
   $a_{1j} \leq \tau < a_{1(j+1)}$
   linear interpolation: $\theta = a_{2j} + \Delta\theta/\Delta\tau(t - a_{1j})$, with $\Delta\theta = a_{2(j+1)} - a_{2j}$ and $\Delta\tau = a_{1(j+1)} - a_{1j}$,
c) calculation of $T_A$: $T_A = \theta/T_K$.

In the above, N is the standard mathemataical notation for the set of natural positive integers (1, 2, 3, . . . ).

The calculation of the time t, at which the anode plate 2 has a given temperature, is calculated in a similar manner. The execution of the above calculations of T or t. The specified method can be adapted to changed parameter values of the x-ray device in an easy manner by simply calculating anew the scaling factors $T_K$ and $t_K$. The calculation method described above remains the same. The accuracy of the method can be set by an appropriate selection of the values of $\Delta\theta$ or $\Delta\tau$ as well as the appropriate approximation method.

Figure 2:
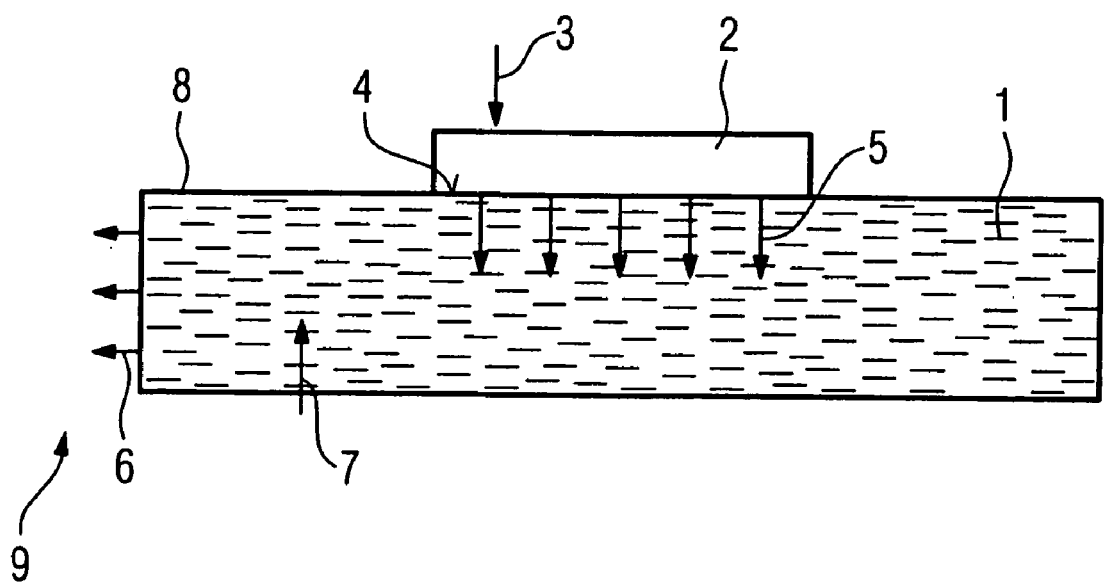
FIG. 2 schematically illustrates an anode plate of a rotary piston x-ray tube coupled to a cooling medium, with the temperature of the cooling medium being changeable.

FIG. 2 depicts schematically an anode plate 2 coupled to the cooling medium 1, wherein the temperature $T_M$ of the cooling medium 1 is changeable, but otherwise corresponding to FIG. 1. The arrow 7 depicts energy absorption of the cooling medium 1 caused by friction of a rotary piston x-ray tube (not shown) in the cooling medium 1. Heat conductance 6 of the cooling medium 1 to the area 9 follows at a second contact area 8 of the cooling medium 1 at area 9.

The temporal temperature change $dT_M/dT$ of the cooling medium is specified by the following differential equation:

$$dT_M/dT = (P + P_R)/C_P m - \lambda F/C_P m (T_M - T_U)$$

wherein
t denotes time
$T_M$ denotes the temperature of the cooling medium 1,
$T_U$ denotes the constant temperature of the area 9,
P denotes the performance directed to anode plate 2,
$P_R$ denotes the performance directed to cooling medium 1 caused by friction
$\lambda$ denotes the heat conductivity,
F denotes the second contact area 8,
$C_P$ denotes the specific heat capacity of cooling medium 1,
m denotes the mass of the cooling medium 1.

In the differential equation the first term on the right side describes the temperature change of the cooling medium 1 with respect to time caused by energy absorption. The cooling medium 1 and the anode plate 2 are ideally coupled. In the first term the energy absorption of the anode plate 2 caused by an absorption of electrons of the electron beam 3 is taken into account. Furthermore the first term takes into account the energy absorption 7 of the cooling medium 1 caused via friction of the rotary piston x-ray tube. The second term on the right side of the differential equation specifies the temperature change of cooling medium 1 with respect to time caused by the heat conductance 6 of the cooling medium 1 to the area 9, with the temperature of the area 9 being regarded as a constant. The differential equation in this example is identical with the differential equation in the preceding instance, such that:

$\tau = t/t_K$, $\theta = T_M/T_K$ are valid, with the scaling factors $T_K = [(P+P_R)/\lambda F + T_U]$ and $t_K = C_P m/\lambda F$ Details of the further calculation are the same as for the preceding example. The method can be adapted to changed parameter values of the x-ray device in a simple manner simply by calculating the scaling factors $T_K$ and $t_K$ anew. The cooling medium 1 can be considered in lieu of the anode plate 2 in the case of an ideal coupling between the anode plate 2 and the cooling medium 1. The energy absorbed by the cooling medium 1 can contain further terms beyond the energy absorption caused by electron absorption. This permits a highly accurate specification of the temperature change of the cooling medium 1 and the anode plate 2 with respect to time µ.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for calculating at least one of a temperature of a solid body or a time required for a change of temperature of the solid body, comprising the steps of:
   i) defining a differential equation $dT/dt = b - cT$ wherein
   T is the temperature of a solid body
   t is time
   b is per unit time temperature change $\Delta T_{EA}$ caused by energy absorption $T_{EA}$,
   cT is the per unit time temperature change $\Delta T_{WA}$ caused by conductance of heat $T_{WA}$,
   ii) converting the differential equation into a dimensionless differential equation:

$d\theta/d\tau = 1 - \theta$, wherein
   $\theta$ is dimensionless temperature
   $\tau$ is dimensionless time,
   iii) determining and programming a computer with a function $\theta(\tau)$ or its inverse function $\tau(\theta)$ that is a solution to the dimensionless differential equation, and compiling a matrix $\underline{A} = (a_{ij})$, with i=1, 2; j ∈ N; $a_{1j} = \tau_j$ and $a_{2j} = \theta_j$, for which $\theta(\tau)$ at the values $\tau_j$ makes: $\theta_j = \theta(\tau_j)$ and $\tau(\theta)$ at the values $\theta_j$ makes $\tau_j = \tau(\theta_j)$;
   iv) in the computer, electronically determining at least one of the temperature T by a) calculating $\tau$ for t,
   b) calculating $\theta$ using the values contained in $\underline{A}$, and
   c) calculating T for the values calculated in step d) for $\theta$, or the time t by
   d) calculating $\theta$ for T,
   e) calculating $\tau$ using the values contained in $\underline{A}$, and
   f) calculating t for the values calculated in step e) for $\tau$; and
   (v) controlling said energy absorption $T_{EA}$ of said solid body dependent on said at least one of said temperature T or said time t.

2. A method as claimed in claim 1 comprising employing an anode of an x-ray tube as said solid body.

3. A method as claimed in claim 2 comprising employing the anode of a rotating piston x-ray tube as said solid body.

4. A method as claimed in claim 2 comprising employing $\Delta T_{EA}$ as an energy absorption caused by absorption of electrons by said anode.

5. A method as claimed in claim 2 comprising employing $\Delta T_{WA}$ as heat conductance from said solid body to a cooling medium in thermal communication with said solid body.

6. A method as claimed in claim 5 comprising employing a cooling medium at a constant temperature as said cooling medium in thermal communication with said solid body.

7. A method as claimed in claim 5 comprising employing a cooling medium in ideal thermal communication with said solid body as said cooling medium in thermal communication with said solid body as cooling medium in thermal communication with said solid body.

8. A method as claimed in claim 5 comprising employing a cooling medium having a variable temperature as said cooling medium in thermal communication with said solid body.

9. A method as claimed in claim 1 comprising employing an anode of a rotary piston x-ray tube as said solid body, and employing, as $T_{EAU}$, an energy absorption caused by friction of said rotary piston x-ray tube in a cooling medium.

10. A method as claimed in claim 1 wherein step (v) comprises controlling the energy absorption of the solid body by comparing the temperature T with at least one limit value for T.

11. A method as claimed in claim 1 wherein step (v) comprises controlling the energy absorption of the solid body by comparing the time t with at least one limit value for t.

12. A method as claimed in claim 1 comprising employing a temperature of a cooling medium in ideal thermal communication with said cooling body as a representative of the temperature of the solid body.

13. A method as claimed in claim 1 comprising employing an anode in a rotating piston x-ray tube as said solid body, and wherein step (v) comprises controlling operation of said rotary piston anode tube dependent on the temperature T.

14. A method as claimed in claim 1 comprising employing an anode in a rotating piston x-ray tube as said solid body, and wherein step (v) comprises controlling operation of said rotary piston anode tube dependent on the time t.

* * * * *